United States Patent
Tomioka

(10) Patent No.: US 9,223,131 B2
(45) Date of Patent: Dec. 29, 2015

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Hiroyuki Tomioka, Osaka (JP)

(73) Assignee: KYOCERA DOCUMENT SOLUTIONS INC, Osaka (JP)

( * ) Notice: Subject to any disclaimer, the term of this patent is extended or adjusted under 35 U.S.C. 154(b) by 0 days.

(21) Appl. No.: 14/710,773

(22) Filed: May 13, 2015

(65) Prior Publication Data

US 2015/0331234 A1    Nov. 19, 2015

(30) Foreign Application Priority Data

May 16, 2014    (JP) .................................. 2014-102368

(51) Int. Cl.
- *G02B 26/12* (2006.01)
- *G02B 26/08* (2006.01)
- *G03G 15/04* (2006.01)

(52) U.S. Cl.
CPC .......... *G02B 26/121* (2013.01); *G02B 26/0841* (2013.01); *G03G 15/04* (2013.01)

(58) Field of Classification Search
CPC ....... G02B 26/121; G03G 15/04; B41J 2/451; B41J 2/471
See application file for complete search history.

(56) References Cited

U.S. PATENT DOCUMENTS

| | | | | |
|---|---|---|---|---|
| 6,219,082 B1 * | 4/2001 | Rumsey | ................... | B41J 2/471 347/242 |
| 6,836,280 B2 * | 12/2004 | Cannon | ................ | G02B 26/123 347/242 |
| 2013/0135696 A1 * | 5/2013 | Mikajiri | ............... | H04N 1/1135 358/494 |

FOREIGN PATENT DOCUMENTS

| | | |
|---|---|---|
| JP | 09-120039 | 5/1997 |
| JP | 11-223787 | 8/1999 |
| JP | 2011-191381 | 9/2011 |

* cited by examiner

*Primary Examiner* — Sandra Brase
(74) *Attorney, Agent, or Firm* — Wenderoth, Lind & Ponack, L.L.P.

(57) ABSTRACT

An image forming apparatus includes an optical scanning device and one or more second driving motors. The optical scanning device includes a polygon mirror, an optical scanning system for forming an image of the beam light on a surface to be scanned, a folding mirror for returning the beam light so as to be led to a photosensitive drum, and a housing. The housing is provided with a first support portion, a second support portion, and a third support portion for supporting the reflective surface of the folding mirror. When a distance between the first support portion and the second support portion is set to L, the third support portion is disposed at the first support portion side from a position of L/4 in a direction of the second support portion from the first support portion and is disposed at the second support portion side from the first support portion.

9 Claims, 4 Drawing Sheets

OPTICAL SCANNING DEVICE AND IMAGE FORMING APPARATUS INCLUDING THE SAME

CROSS-REFERENCE TO RELATED APPLICATION

This application is based upon and claims the benefit of priority from Japanese Patent Application No. 2014-102368 filed on May 16, 2014, the entire contents of which are incorporated herein by reference.

BACKGROUND

The present disclosure relates to an optical scanning device that forms a latent image on a surface to be scanned by exposure scanning, and an image forming apparatus including the same such as a copy machine, a printer, a facsimile, and a multifunctional peripheral thereof.

An optical scanning device used in a copy machine, a printer and the like generally includes a light source, a polygon mirror (a rotating polygon mirror) that deflects and scans beam light from the light source, a driving motor that rotates the polygon mirror, a fθ lens that forms an image of the beam light deflected by the polygon mirror on a surface to be scanned, a folding mirror that returns the beam light having passed through the fθ lens so as to be led to an image carrying member, and a housing to which these elements are fixed.

The housing has a bottom surface portion to which the polygon mirror, the fθ lens, and the folding mirror are fixed, and a side wall portion vertically installed from an edge portion of the bottom surface portion. The beam light output from the light source passes through the polygon mirror and the fθ lens, is returned by the folding mirror, and then is irradiated toward a photosensitive drum (an image carrying member) via an opening formed in the bottom surface portion of the housing.

Since the orientation (a mounting angle) of the folding mirror has an influence on an irradiation position of the beam light to the photosensitive drum and an image position on a sheet (a recording medium), high dimension accuracy is required in support portions of the housing, which support the folding mirror. Therefore, it is general that support surfaces of the support portions are formed as surfaces as small as possible and the folding mirror is supported by three support portions. In such a configuration, typically, three points of vertical two points of one end portion of a reflective surface of the folding mirror in a longitudinal direction and one point of the center of the other end portion thereof are supported by the support portions.

For example, as with an apparatus compatible with an A3 size, when an area for deflecting and scanning light is wide or when a distance from the photosensitive drum to the folding mirror is short, the folding mirror becomes long. Therefore, since a natural frequency of the folding mirror is reduced, there is a case in which the natural frequency of the folding mirror approximately coincides with a driving frequency of the driving motor and thus the folding mirror resonates with the driving motor.

In order to avoid such a problem, it is necessary to decrease or increase the natural frequency of the folding mirror and thereby to allow the natural frequency of the folding mirror to be kept away from the driving frequency of the driving motor. In this regard, there has been proposed an optical scanning device that decreases the natural frequency of the folding mirror by sticking a weight to the folding mirror. However, in the case of sticking a weight to the folding mirror, there is a case in which an assembling process is increased and the folding mirror is bent by the weight. Furthermore, since many other driving motors driven with driving frequencies lower than that of the driving motor for driving the polygon motor exist in an image forming apparatus, even though the natural frequency of the folding mirror is decreased by sticking a weight to the folding mirror, there is a case in which the other driving motors and the folding mirror resonate with each other.

In this regard, there has been proposed an optical scanning device that increases the natural frequency of the folding mirror by supporting each one point of one end portion, a center portion, and the other end portion of the reflective surface the folding mirror in the longitudinal direction. In this optical scanning device, the one end portion and the other end portion of the reflective surface in the longitudinal direction are supported by, for example, an upper side in a transverse direction, and the center portion of the reflective surface in the longitudinal direction is supported by, for example, a lower side in the transverse direction, so that three point support is realized. In addition, in this optical scanning device, since an approximately center of the reflective surface in the longitudinal direction is supported and thus a distance between the support points is reduced to about ½, the natural frequency of the folding mirror is increased about twice.

SUMMARY

An image forming apparatus according to one aspect of the present disclosure includes an optical scanning device and one or more second driving motors that drive an element other than the optical scanning device. The optical scanning device includes a rotating polygon mirror for deflecting and scanning beam light from a light source unit, a first driving motor for rotating the rotating polygon mirror, a lens for forming an image of the beam light deflected by the rotating polygon mirror on a surface to be scanned, a folding mirror for returning the beam light having passed through the lens so as to be led to an image carrying member, and a housing to which the rotating polygon mirror, the lens, and the folding mirror are fixed. The housing is provided with an opening for allowing the beam light from the folding mirror to reach the surface to be scanned by passing therethrough and a plurality of support portions disposed in the vicinity of the opening to support a reflective surface of the folding mirror. The plurality of support portions have first to third support portions. The first and second support portions respectively support both end portions of the reflective surface in a longitudinal direction. The third support portion supports a part of the reflective surface between the first support portion and the second support portion in the longitudinal direction. When a distance between the first support portion and the second support portion in the longitudinal direction is set to L, the third support portion is disposed at the first support portion side from a position of L/4 in a direction of the second support portion from the first support portion. When the natural frequency of the folding mirror when the folding mirror has been supported at an interval of the distance L is set to A1 Hz and driving frequencies of the first driving motor and the second driving motor are respectively set to B1 Hz and B2 Hz, the folding mirror and at least one second driving motor satisfy the relation of |A1−B2|<20 Hz. When the third support portion is disposed at the second support portion side from the first support portion and the natural frequency of the folding mirror when the folding mirror has been supported by the first support portion, the second support portion, and the third support portion is set to A2 Hz, the folding mirror and all the second driving motors satisfy the relation of $|A2-B2| \geq 20$ Hz, and the folding mirror and the first driving motor satisfy the relation of $|A2-B1| \geq 20$ Hz.

DETAILED DESCRIPTION

Figure 1:
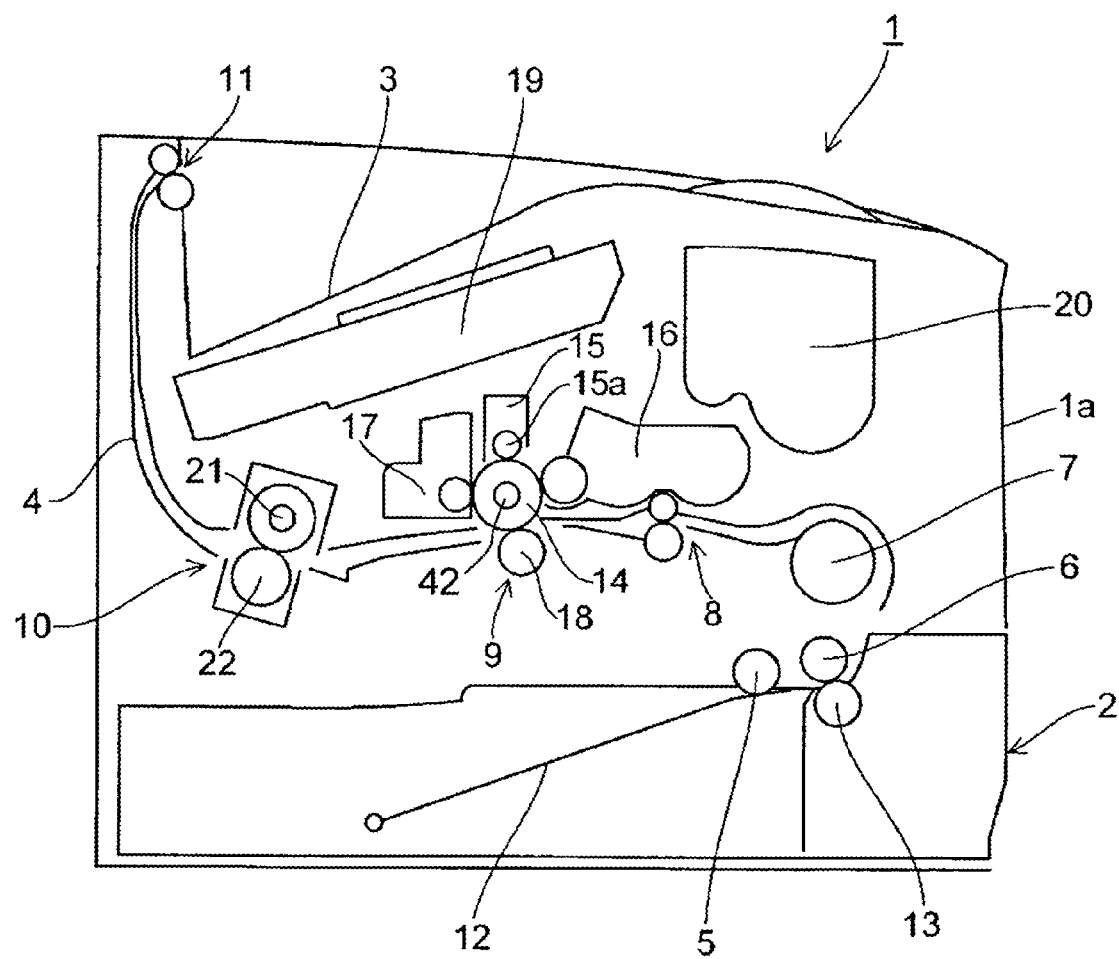
FIG. 1 is a sectional view schematically illustrating a structure of an image forming apparatus including an optical scanning device according to a first embodiment.

Hereinafter, embodiments will be described with reference to the drawings.

First Embodiment

With reference to FIG. 1 to FIG. 4, an image forming apparatus 1 including an optical scanning device 19 according to a first embodiment will be described.

At a lower portion of an apparatus body 1a of the image forming apparatus 1 of the present embodiment, a paper feeding cassette 2 for accommodating loaded papers (recording media) is disposed. In addition, in FIG. 1, the right side is illustrated as a front side of the image forming apparatus 1. Above the paper feeding cassette 2, a paper conveyance path 4 is formed to extend substantially horizontally from the front side to the rear side of the apparatus body 1a, to further extent upward, and to reach a paper discharge unit 3 formed on the upper surface of the apparatus body 1a. Sequentially from an upstream side along the paper conveyance path 4, a pick-up roller 5, a feed roller 6, an intermediate conveying roller 7, a resist roller pair 8, an image forming unit 9, a fixing unit 10, and a discharge roller pair 11 are disposed.

The paper feeding cassette 2 is provided with a paper loading plate 12 rotatably supported to the paper feeding cassette 2. When papers loaded on the paper loading plate 12 have been sent toward the paper conveyance path 4 by the pick-up roller 5 and a plurality of papers have been simultaneously sent by the pick-up roller 5, it is configured that the papers are loosened by the feed roller 6 and a retard roller 13 and only one uppermost paper is conveyed. The papers sent to the paper conveyance path 4 are conveyed to the resist roller pair by the intermediate conveying roller 7 by changing the conveyance direction to the rear side of the apparatus body 1a, and are supplied to the image forming unit 9 by the resist roller pair 8 with its timing adjusted.

The image forming unit 9 forms a predetermined toner image on a paper by an electrophotographic process, and includes a photosensitive drum 14 serving as an image carrying member pivotally supported to be rotatable clockwise in FIG. 1, and a charging device 15, a developing device 16, a cleaning device 17, a transfer roller 18, and the optical scanning device 19 disposed in the vicinity of the photosensitive drum 14, wherein the transfer roller 18 is disposed so as to face the photosensitive drum 14 while interposing the paper conveyance path 4 therebetween, and the optical scanning device 19 is disposed above the photosensitive drum 14. Above the developing device 16, a toner container 20 for refilling toner to the developing device 16 is disposed.

The charging device 15 includes a conductive rubber roller 15a connected to a power supply (not illustrated), wherein the conductive rubber roller 15a is disposed so as to abut the photosensitive drum 14. When the photosensitive drum 14 rotates, the conductive rubber roller 15a contacts with the surface of the photosensitive drum 14 and is driven to rotate. At this time, a predetermined voltage is applied to the conductive rubber roller 15a, so that the surface of the photosensitive drum 14 is uniformly charged.

Next, an electrostatic latent image based on input image data is formed on the photosensitive drum 14 by beam light emitted from the optical scanning device 19, and toner is attached to the electrostatic latent image by the developing device 16, so that a toner image is formed on the surface of the photosensitive drum 14. Then, a paper is supplied from the resist roller pair 8 to a nip portion (a transfer position) between the photosensitive drum 14 and the transfer roller 18 at a predetermined timing, so that the toner image of the surface of the photosensitive drum 14 is transferred onto the paper by the transfer roller 18.

The paper with the transferred toner image is separated from the photosensitive drum 14 and is conveyed toward the fixing unit 10. The fixing unit 10 is disposed at a downstream side of the image forming unit 9 with respect to the paper conveyance direction, and the paper with the transferred toner image in the image forming unit 9 is heated and pressed by a heating roller 21 and a pressing roller 22 brought into press-contact with the heating roller 21, which are provided in the fixing unit 10, so that the toner image transferred onto the paper is fixed.

The image-formed paper is discharged to the paper discharge unit 3 by the discharge roller pair 11. On the other hand, toner remaining on the surface of the photosensitive drum 14 after the transfer is removed by the cleaning device 17, the photosensitive drum 14 is charged again by the charging device 15, and the image formation is performed in the same manner.

Figure 2:
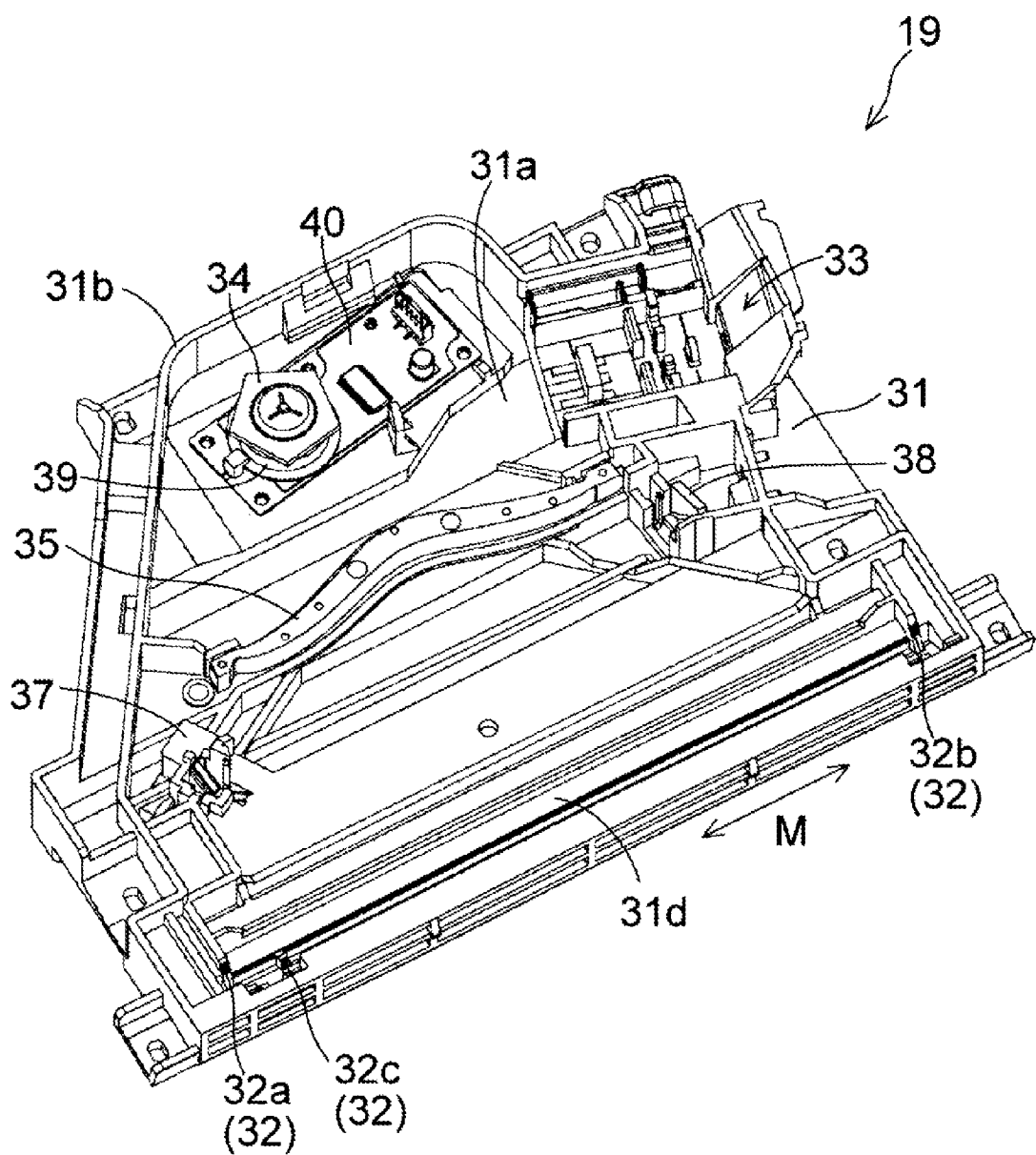
FIG. 2 is a perspective view illustrating a structure of an optical scanning device of a first embodiment when viewed from an upper side.
Figure 3:
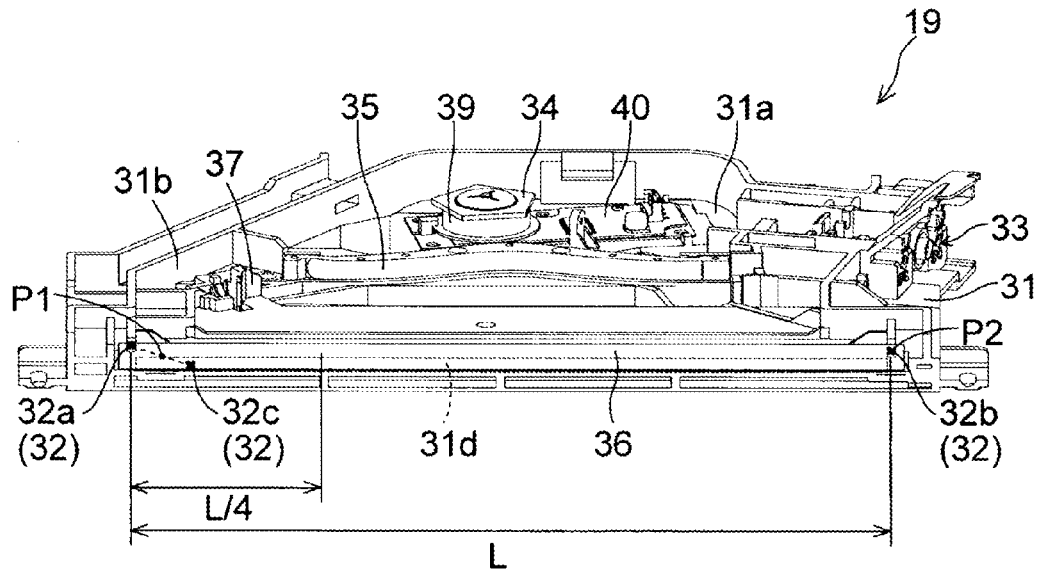
FIG. 3 is a perspective view for explaining a structure of support portions of a housing and a folding mirror of an optical scanning device according to a first embodiment.
Figure 4:
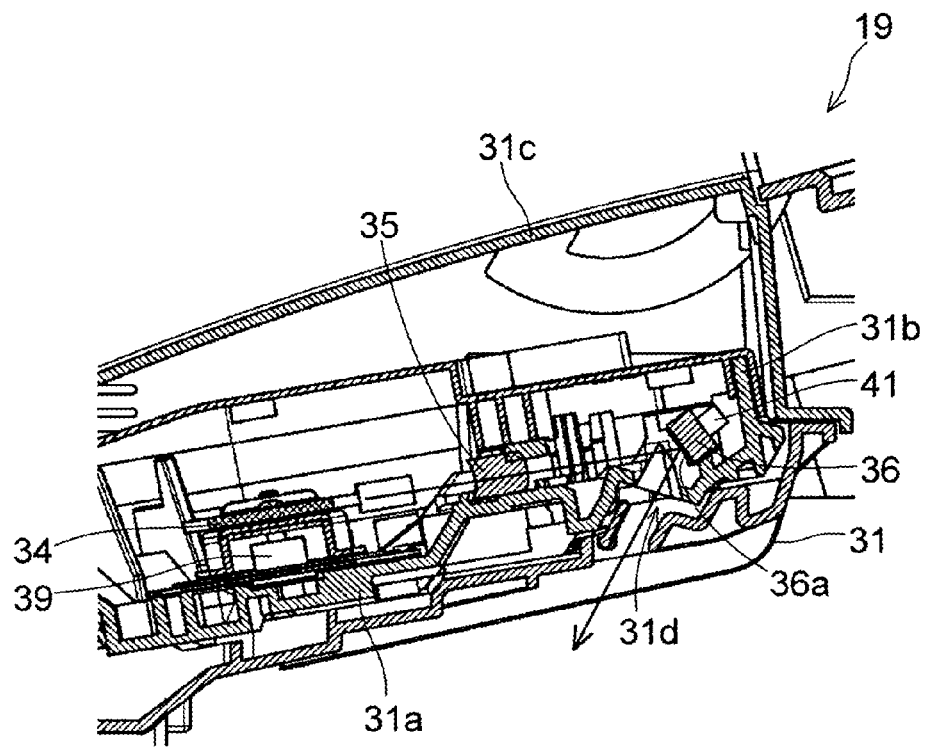
FIG. 4 is a sectional view illustrating a structure of an optical scanning device of a first embodiment.

Next, the optical scanning device 19 will be described. As illustrated in FIG. 2 to FIG. 4, the optical scanning device 19 includes a light source unit 33, a polygon mirror 34 serving as a rotating polygon mirror, a scanning optical system (a lens) 35, a folding mirror 36, a detection sensor 38, and a housing 31 to which these elements are fixed. In addition, in FIG. 2, the folding mirror 36 is not illustrated.

The light source unit 33 has a light source such as a laser diode for outputting laser light, and a cylindrical lens, a collimate lens and the like for shaping a beam diameter of the laser light, and outputs beam light modulated on the basis of image data input from a personal computer and the like (not illustrated).

The polygon mirror 34 is rotated by the polygon motor (a first driving motor) 39 at a predetermined speed, and deflects the beam light, which is output from the light source unit 33, so as to be scanned in a main scanning direction M. The polygon motor 39 is driven and controlled by a circuit board 40.

The scanning optical system 35 includes one or more lenses, and refracts the beam light reflected by the polygon mirror 34 so as to be scanned in the main scanning direction M at a constant speed, and forms an image of the beam light on a surface to be scanned. In addition, in the present embodiment, the scanning optical system 35 includes one fθ lens. However, the scanning optical system 35 may also include two or more fθ lenses. As illustrated in FIG. 4, the folding mirror 36 reflects the beam light having passed through the scanning optical system 35 so as to be returned toward the lower side of the scanning optical system 35, and leads the beam light to the photosensitive drum 14 (see FIG. 1).

As illustrated in FIG. 2, the detection sensor 38 outputs a signal for controlling an exposure range of the main scanning direction M, and receives the beam light having passed through the scanning optical system 35 via the detection mirror 37 disposed out of the exposure range.

In the aforementioned configuration, as illustrated in FIG. 2 to FIG. 4, the light source unit 33 outputs the beam light modulated on the basis of image data toward the polygon mirror 34. The polygon mirror 34 reflects the beam light output from the light source unit 33, and deflects and scans the reflected light by the rotation thereof. The scanning optical system 35 converts the beam light reflected by the polygon mirror 34 into constant speed scanning light, and forms an image of the constant speed scanning light on the surface of the photosensitive drum 14 (see FIG. 1) serving as a surface to be scanned via the folding mirror 36. In this way, the optical scanning device 19 exposes and scans a predetermined range on the photosensitive drum 14 in the scanning direction M, so that an electrostatic latent image is formed on the photosensitive drum 14.

The housing 31, to which the polygon mirror 34 and the folding mirror 36 are fixed, has a bottom surface portion 31a having an approximately flat plate shape and made of resin with good thermal conductivity, a side wall portion 31b rising from a peripheral edge of the bottom surface portion 31a, and an upper lid 31c (see FIG. 4) mounted in an upper edge of the side wall portion 31b. In a space formed by the bottom surface portion 31a, the side wall portion 31b, and the upper lid 31c, the polygon mirror 34, the scanning optical system 35, the folding mirror 36 and the like are accommodated. In addition, in FIG. 2 and FIG. 3, the upper lid 31c is omitted.

The polygon mirror 34 is integrally mounted at a rotating shaft of the polygon motor 39, and the polygon motor 39 is fixed to the bottom surface portion 31a while interposing the circuit board 40 between the polygon motor 39 and the bottom surface portion 31a. The circuit board 40 is provided with a driver IC and the like for controlling the rotation driving of the polygon motor 39, and is fixed to the bottom surface portion 31a.

As illustrated in FIG. 4, the folding mirror 36 is inclined with respect to the bottom surface portion 31a and the side wall portion 31b by a predetermined angle and is fixed thereto in order to reflect the beam light output from the scanning optical system 35 toward the photosensitive drum 14 (see FIG. 1).

The bottom surface portion 31a is formed with an opening 31d for allowing the beam light from the folding mirror 36 to reach the photosensitive drum 14 by passing therethrough. The opening 31d is an opening which is formed in the vicinity of the folding mirror 36 and extends in the main scanning direction M so as to be slightly shorter than the horizontally long folding mirror 36.

Furthermore, at the bottom surface portion 31a, a plurality of support portions 32 are integrally formed with one another to support a reflective surface 36a of the folding mirror 36. As illustrated in FIG. 3, the support portions 32 have a first support portion 32a and a second support portion 32b for supporting both end portions of the reflective surface 36a in a longitudinal direction (the main scanning direction M), and a third support portion 32c for supporting a part between the first support portion 32a and the second support portion 32b of the reflective surface 36a in the longitudinal direction. In the three support portions 32, support surfaces for supporting the folding mirror 36 are formed as small planes, and the orientation (a mounting angle) of the folding mirror 36 is held at a predetermined angle with high accuracy.

The first support portion 32a is disposed at one side (a left side) of the folding mirror 36 in the longitudinal direction, and the second support portion 32b is disposed at the other side (a right side). A distance of the folding mirror 36 in the longitudinal direction between the first support portion 32a and the second support portion 32b is set to L.

Here, a natural frequency of the folding mirror 36 when the folding mirror 36 has been supported at an interval of the distance L is set to A1 (about 300) Hz. Furthermore, a driving frequency of the polygon motor 39 is about 450 Hz (about 400 Hz or more and about 800 Hz or less), and a driving frequency of a drum motor (a second driving motor) 42 (see FIG. 1) for rotating the photosensitive drum 14 is about 300 Hz. That is, since the natural frequency of the folding mirror 36 coincides with the driving frequency of the drum motor 42, when a driving frequency of a driving motor (a second driving motor) for driving elements other than the optical scanning device 19 mounted in the image forming apparatus 1 is set to B2 Hz, the folding mirror 36 and at least one second driving motor (here, the drum motor 42) satisfy the relation of |A1−B2|<20 Hz.

In addition, the driving frequency of the polygon motor is the highest among all driving motors mounted in the image forming apparatus 1, and the driving frequency of the drum motor 42 is the second highest.

The third support portion 32c is disposed at the first support portion 32a side from a position of L/4 in a direction of the second support portion 32b from the first support portion 32a.

Furthermore, the third support portion 32c is disposed at the second support portion 32b side from the first support portion 32a, and for example, is disposed at the second support portion 32b side by 15 mm from the first support portion 32a. In this way, when the natural frequency of the folding mirror 36 when the folding mirror 36 has been supported by the first support portion 32a, the second support portion 32b, and the third support portion 32c is set to A2 (about 330 Hz), the folding mirror 36 and all the second driving motors satisfy the relation of |A2−B2|≥30 Hz, and the driving frequency of the polygon motor 39 is set to B1 Hz, the folding mirror 36 and the polygon motor 39 satisfy the relation of |A2−B1|≥30 Hz.

Furthermore, the first support portion 32a supports an upper end (one end in the transverse direction) of the reflective surface 36a, and the third support portion 32c supports a lower end (the other end in the transverse direction) of the reflective surface 36a. The second support portion 32b supports an upper side (one end side) from the center of the reflective surface 36a in the transverse direction. In addition, the first support portion 32a and the second support portion 32b are disposed at the left side and the right side from an area to be irradiated, to which the beam light of the reflective surface 36a is irradiated, and the third support portion 32c is disposed at a lower side from the area to be irradiated.

Furthermore, the rear surface (the back surface) of the folding mirror 36 is pressed to the support portions 32 side by two pressing members 41 (see FIG. 4) including leaf springs. One of the pressing members 41 presses a part P1 (see FIG. 3) of the rear surface of the folding mirror 36, which corresponds to an intermediate position between the first support portion 32a and the second support portion 32b, and the other one of the pressing members 41 presses a part P2 (see FIG. 3)

of the rear surface of the folding mirror 36, which corresponds to the second support portion 32b.

In the present embodiment, as described above, the folding mirror 36 and at least one second driving motor (here, the drum motor 42) mounted in the image forming apparatus 1 satisfy the relation of |A1−B2|<20 Hz, the third support portion 32c is disposed at the second support portion 32b side from the first support portion 32a, the folding mirror 36 and all the second driving motors satisfy the relation of |A2−B2|≥20 Hz, and the folding mirror 36 and the polygon motor 39 satisfy the relation of |A2−B1|≥20 Hz. That is, from the state in which the natural frequency of the folding mirror 36 approaches the driving frequency of the second driving motor (here, the drum motor 42), the third support portion 32c is disposed at the second support portion 32b side from the first support portion 32a and thus the natural frequency of the folding mirror 36 is increased, so that the natural frequency of the folding mirror 36 is kept away from the driving frequencies of all the driving motors (the first driving motor and the second driving motor) by 20 Hz or more. In this way, it is possible to prevent the folding mirror 36 form resonating with the driving motors (the first driving motor and the second driving motor), so that it is possible to prevent an image quality from being degraded.

Furthermore, when a distance between the first support portion 32a and the second support portion 32b in the longitudinal direction is set to L, the third support portion 32c is disposed at the first support portion 32a side from the position of L/4 in the direction of the second support portion 32b from the first support portion 32a. In this way, the third support portion 32c can be disposed to be kept away from the center portion of the opening 31d, so that it is possible to prevent vibration of the third support portion 32c from becoming large. Consequently, it is possible to prevent the lower end (the other end in the transverse direction) of the folding mirror 36 from being rotated (vibrated) about the upper end (one end in the transverse direction) of the folding mirror 36, so that it is possible to further prevent an image quality from being degraded.

Furthermore, the third support portion 32c is disposed at the first support portion 32a side from the position of L/4 in the direction of the second support portion 32b from the first support portion 32a, so that it is possible to prevent resonance of the folding mirror 36 with respect to first, second, third, and fourth vibration modes of the second driving motor (here, the drum motor 42).

Furthermore, as described above, the pressing members 41 press the part P1 of the rear surface of the folding mirror 36, which corresponds to the intermediate position between the first support portion 32a and the third support portion 32c. In this way, the folding mirror 36 can be pressed by the first support portion 32a and the third support portion 32c by one pressing member 41, so that it is possible to reduce the number of pressing members 41 as compared with the case in which the pressing member 41 for pressing the folding mirror 36 by the first support portion 32a and the pressing member 41 for pressing the folding mirror 36 by the third support portion 32c are separately provided.

Furthermore, as described above, the folding mirror 36 and all the driving motors (the first driving motor and the second driving motor) satisfy the relations of |A2−B1|≥30 Hz and |A2−B2|≥30 Hz. In this way, the natural frequency of the folding mirror 36 can be kept away from the driving frequencies of all the driving motors by 30 Hz or more, so that it is possible to sufficiently prevent the folding mirror 36 from resonating with the driving motors.

Furthermore, as described above, since the natural frequency of the folding mirror 36 is easy to approximately coincide with the driving frequency of the polygon motor 39 or the drum motor 42, it is particularly effective to arrange the third support portion 32c such that the polygon motor 39 and the drum motor 42 satisfy the relations of |A2−B1|≥20 Hz and |A2−B2|≥20 Hz.

Second Embodiment

Next, with reference to FIG. 5, the optical scanning device 19 of a second embodiment will be described.

Figure 5:
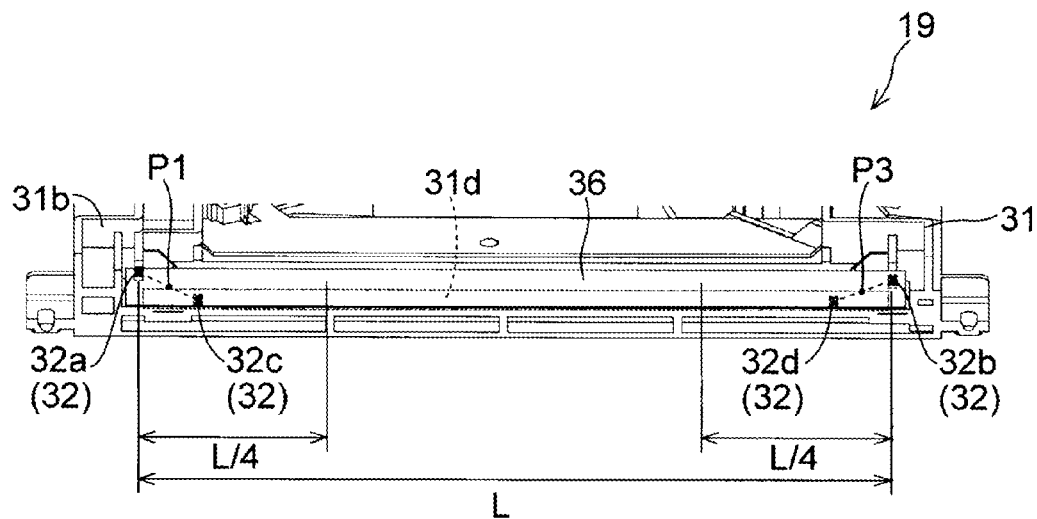
FIG. 5 is a sectional view illustrating a structure around support portions of a housing of an optical scanning device of a second embodiment.

In the second embodiment, as illustrated in FIG. 5, the support portions 32 have a fourth support portion 32d in addition to the first support portion 32a, the second support portion 32b, and the third support portion 32c. In the present embodiment, the same plane for high accurately supporting the folding mirror 36 is configured by the four support portions 32.

The fourth support portion 32d is disposed at the second support portion 32b side from a position of L/4 in a direction of the first support portion 32a from the second support portion 32b.

Furthermore, the fourth support portion 32d is disposed at the first support portion 32a side from the second support portion 32b, and for example, is disposed at the first support portion 32a side by 15 mm from the second support portion 32b. In this way, the natural frequency of the folding mirror 36 when the folding mirror 36 has been supported by the first support portion 32a, the second support portion 32b, the third support portion 32c, and the fourth support portion 32d is set to A3 (about 360) Hz. That is, the folding mirror 36 and all the driving motors (the first driving motor and the second driving motor) satisfy the relations of |A2−B1|≥50 Hz and |A2−B2|≥50 Hz.

Furthermore, the fourth support portion 32d supports the lower end (the other end in the transverse direction) of the reflective surface 36a. In addition, the fourth support portion 32d is disposed at a lower side from an area to be irradiated of the reflective surface 36a.

The right one (the other one) of the pressing members 41 presses a part P3 of the rear surface of the folding mirror 36, which corresponds to an intermediate position between the second support portion 32b and the fourth support portion 32d.

The other structures of the second embodiment are similar to those of the aforementioned first embodiment.

In the present embodiment, as described above, the fourth support portion 32d for supporting the reflective surface 36a of the folding mirror 36 is provided and is disposed at the first support portion 32a side from the second support portion 32b, so that it is possible to further increase the natural frequency of the folding mirror 36 and thus allow the natural frequency of the folding mirror 36 to be kept away from the driving frequency of the drum motor 42. In this way, it is possible to further prevent the folding mirror 36 from resonating with the drum motor 42.

Furthermore, the fourth support portion 32d is disposed at the second support portion 32b side from the position of L/4 in the direction of the first support portion 32a from the second support portion 32b. In this way, the fourth support portion 32d can be disposed to be kept away from the center portion of the opening 31d, so that it is possible to prevent the vibration of the fourth support portion 32d from becoming large. Consequently, even though the fourth support portion 32d is provided and thus the natural frequency of the folding mirror 36 is increased, it is possible to prevent the lower end (the other end in the transverse direction) of the folding mirror 36 from being rotated (vibrated) about the upper end (one end in the transverse direction) of the folding mirror 36.

Furthermore, as described above, the pressing members 41 press the part P3 of the rear surface of the folding mirror 36, which corresponds to the intermediate position between the second support portion 32b and the fourth support portion 32d. In this way, the folding mirror 36 can be pressed by the second support portion 32b and the fourth support portion 32d by one pressing member 41, so that it is possible to reduce the number of pressing members 41 as compared with the case in which the pressing member 41 for pressing the folding mirror 36 by the second support portion 32b and the pressing member for pressing the folding mirror 36 by the fourth support portion 32d are separately provided.

Furthermore, as described above, the folding mirror 36 and all the driving motors (the first driving motor and the second driving motor) satisfy the relations of |A2−B1|≥50 Hz and |A2−B2|≥50 Hz. In this way, the natural frequency of the folding mirror 36 can be kept away from the driving frequencies of all the driving motors by 50 Hz or more, so that it is possible to more sufficiently prevent the folding mirror 36 from resonating with the driving motors.

The other effects of the second embodiment are similar to those of the aforementioned first embodiment.

Third Embodiment

Next, with reference to FIG. 6, the optical scanning device 19 of a third embodiment will be described.

Figure 6:
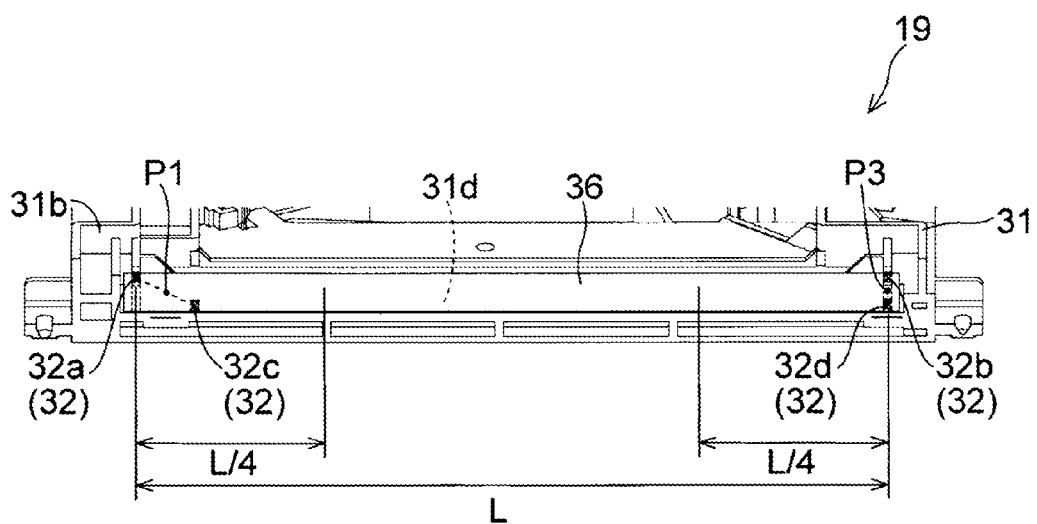
FIG. 6 is a sectional view illustrating a structure around support portions of a housing of an optical scanning device of a third embodiment.

In the third embodiment, as illustrated in FIG. 6, similarly to the second embodiment, the support portions 32 have the fourth support portion 32d in addition to the first support portion 32a, the second support portion 32b, and the third support portion 32c.

The fourth support portion 32d is disposed at the second support portion 32b side from the position of L/4 in the direction of the first support portion 32a from the second support portion 32b, and in the present embodiment, the fourth support portion 32d is disposed at the same position as that of the second support portion 32b of the folding mirror 36 in the longitudinal direction. In this way, the natural frequency of the folding mirror 36 when the folding mirror 36 has been supported by the first support portion 32a, the second support portion 32b, the third support portion 32c, and the fourth support portion 32d is set to A4 (about 330) Hz.

The second support portion 32b supports the upper end (one end in the transverse direction) of the reflective surface 36a, and the fourth support portion 32d supports the lower end (the other end in the transverse direction) of the reflective surface 36a.

The other structures of the third embodiment are similar to those of the aforementioned first and second embodiments.

In the present embodiment, as described above, the fourth support portion 32d for supporting the reflective surface 36a of the folding mirror 36 is provided, the second support portion 32b supports the upper end (one end in the transverse direction) of the reflective surface 36a, and the fourth support portion 32d supports the lower end (the other end in the transverse direction) of the reflective surface 36a. In this way, it is possible to prevent the lower end of the folding mirror 36 from being rotated (vibrated) about the upper end of the folding mirror 36, so that it is possible to further prevent an image quality from being degraded.

Furthermore, the fourth support portion 32d is disposed at the second support portion 32b side from the position of L/4 in the direction of the first support portion 32a from the second support portion 32b. In this way, the fourth support portion 32d can be disposed to be kept away from the center portion of the opening 31d, so that it is possible to prevent the vibration of the fourth support portion 32d from becoming large.

The other effects of the third embodiment are similar to those of the aforementioned first and second embodiments.

In addition, it should be noted that the embodiments disclosed herein are illustrative in all respects and are not restrictive. The technical scope of the present disclosure is defined by the scope of the appended claims rather than the description of the aforementioned embodiments, and is intended to include all modifications within the meaning and scope equivalent to the scope of the appended claims.

For example, the example, in which the technology of the present disclosure has been applied to the monochrome printer as illustrated in FIG. 1, has been described. However, the technology of the present disclosure is not limited thereto. It goes without saying that the technology of the present disclosure can be applied to various image forming apparatuses provided with an optical scanning device that forms a latent image on a surface to be scanned by exposure scanning, such as a color printer, a color copy machine, a monochrome copy machine, a digital multifunction machine, and a facsimile.

Furthermore, the aforementioned embodiments have described the case in which the natural frequency A1 of the folding mirror 36 when the folding mirror 36 has been supported at an interval of the distance L coincides with the driving frequency of the drum motor 42. However, the technology of the present disclosure can also be applied to the case in which the natural frequency A1 of the folding mirror 36 approaches the driving frequency of the second driving motor other than the polygon motor 39 and the drum motor 42 (the case in which a difference is smaller than 20 Hz).

Furthermore, the technology of the present disclosure includes configurations obtained by appropriately combining the aforementioned embodiments with configurations of modifications.

What is claimed is:
1. An image forming apparatus comprising:
an optical scanning device including a rotating polygon mirror for deflecting and scanning beam light from a light source unit, a first driving motor for rotating the rotating polygon mirror, a lens for forming an image of the beam light deflected by the rotating polygon mirror on a surface to be scanned, a folding mirror for returning the beam light having passed through the lens so as to be led to an image carrying member, and a housing to which the rotating polygon mirror, the lens, and the folding mirror are fixed; and
one or more second driving motors that drive an element other than the optical scanning device,
wherein the housing is provided with an opening for allowing the beam light from the folding mirror to reach the surface to be scanned by passing therethrough and a plurality of support portions disposed in the vicinity of the opening to support a reflective surface of the folding mirror,
the plurality of support portions have a first support portion and a second support portion for supporting both end portions of the reflective surface in a longitudinal direction and a third support portion for supporting a part of the reflective surface between the first support portion and the second support portion in the longitudinal direction, when a distance between the first support portion and the second support portion in the longitudinal direction is set to L, the third support portion is disposed at a side of the first support portion from a position of L/4 in a direction of the second support portion from the first support portion, when a natural frequency of the folding mirror when the folding mirror has been supported at an interval of the distance L is set to A1 Hz and driving frequencies of the first driving motor and the second driving motor are respectively set to B1 Hz and B2 Hz, the folding mirror and at least one second driving motor satisfy a relation of $|A1-B2|<20$ Hz, and when the third support portion is disposed at a side of the second support portion from the first support portion and a natural frequency of the folding mirror when the folding mirror has been supported by the first support portion, the second support portion, and the third support portion is set to A2 Hz, the folding mirror and all the second driving motors satisfy a relation of $|A2-B2|≥20$ Hz, and the folding mirror and the first driving motor satisfy a relation of $|A2-B1|≥20$ Hz.

2. The image forming apparatus of claim 1, wherein the plurality of support portions have a fourth support portion for supporting the reflective surface of the folding mirror, the fourth support portion is disposed at the side of the first support portion from the second support portion and is disposed at the side of the second support portion from a position of L/4 in a direction of the first support portion from the second support portion.

3. The image forming apparatus of claim 2, wherein the image forming apparatus comprises:

a pressing member that presses a rear surface of the folding mirror to a side of the support portion, wherein the pressing member presses a part of the rear surface, which corresponds to an intermediate position between the second support portion and the fourth support portion.

4. The image forming apparatus of claim 1, wherein the plurality of support portions have a fourth support portion for supporting the reflective surface of the folding mirror, the second support portion supports one end portion of the reflective surface in a transverse direction, the fourth support portion is disposed at the side of the second support portion from a position of L/4 in a direction of the first support portion from the second support portion, and supports the other end portion of the reflective surface in the transverse direction.

5. The image forming apparatus of claim 1, wherein the image forming apparatus comprises:

a pressing member that presses a rear surface of the folding mirror to a side of the support portion, wherein the pressing member presses a part of the rear surface, which corresponds to an intermediate position between the first support portion and the third support portion.

6. The image forming apparatus of claim 1, wherein the folding mirror and all the second driving motors satisfy a relation of $|A2-B2|≥30$ Hz, and the folding mirror and the first driving motor satisfy a relation of $|A2-B1|≥30$ Hz.

7. The image forming apparatus of claim 1, wherein the second driving motor is a driving motor that rotates the image carrying member.

8. An optical scanning device comprising:

a rotating polygon mirror that deflects and scans beam light from a light source unit a first driving motor that rotates the rotating polygon mirror;

a lens that forms an image of the beam light deflected by the rotating polygon mirror on a surface to be scanned;

a folding mirror that returns the beam light having passed through the lens so as to be led to an image carrying member; and a housing to which the rotating polygon mirror, the lens, and the folding mirror are fixed, wherein the housing is provided with an opening for allowing the beam light from the folding mirror to reach the surface to be scanned by passing therethrough and a plurality of support portions disposed in the vicinity of the opening to support a reflective surface of the folding mirror, the plurality of support portions have a first support portion and a second support portion for supporting both end portions of the reflective surface in a longitudinal direction and a third support portion for supporting a part of the reflective surface between the first support portion and the second support portion in the longitudinal direction, when a distance between the first support portion and the second support portion in the longitudinal direction is set to L, the third support portion is disposed at a side of the first support portion from a position of L/4 in a direction of the second support portion from the first support portion, when a natural frequency of the folding mirror when the folding mirror has been supported at an interval of the distance L is set to A1 Hz and a driving frequency of the first driving motor is set to B1 Hz, the folding mirror and the first driving motor satisfy a relation of $|A1-B1|<20$ Hz, and when the third support portion is disposed at a side of the second support portion from the first support portion and a natural frequency of the folding mirror when the folding mirror has been supported by the first support portion, the second support portion, and the third support portion is set to A2 Hz, the folding mirror and the first driving motor satisfy a relation of $|A2-B1|≥20$ Hz.

9. An image forming apparatus comprising:

the optical scanning device of claim 8; and an image carrying member which an electrostatic latent image is formed by the beam light output from the light source unit.

* * * * *